F. M. EASTON.
SAWING MACHINE.
APPLICATION FILED MAR. 28, 1919.
1,312,964.
Patented Aug. 12, 1919.
2 SHEETS—SHEET 1.
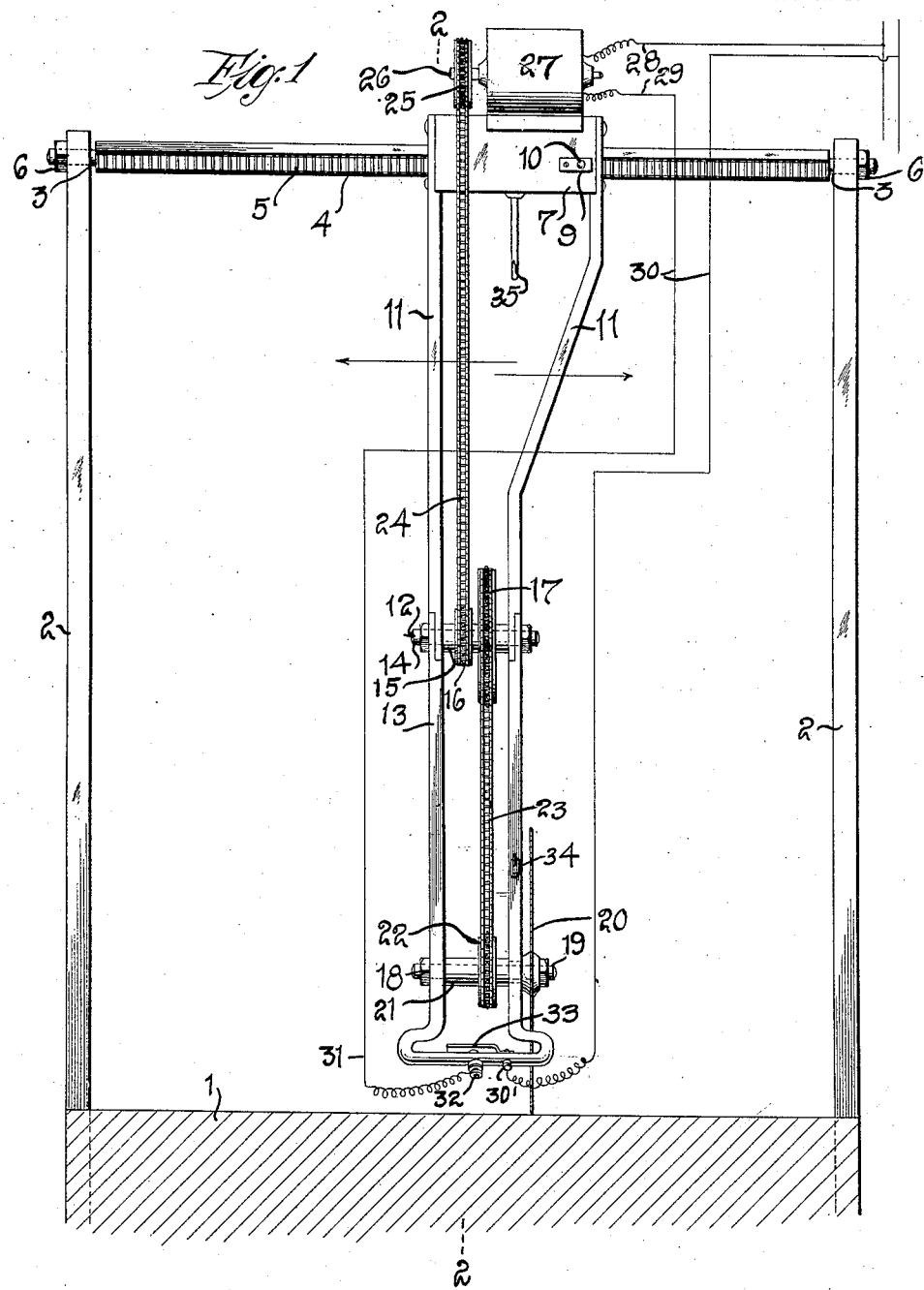

F. M. EASTON.
SAWING MACHINE.
APPLICATION FILED MAR. 28, 1919.
1,312,964.
Patented Aug. 12, 1919.
2 SHEETS—SHEET 2.
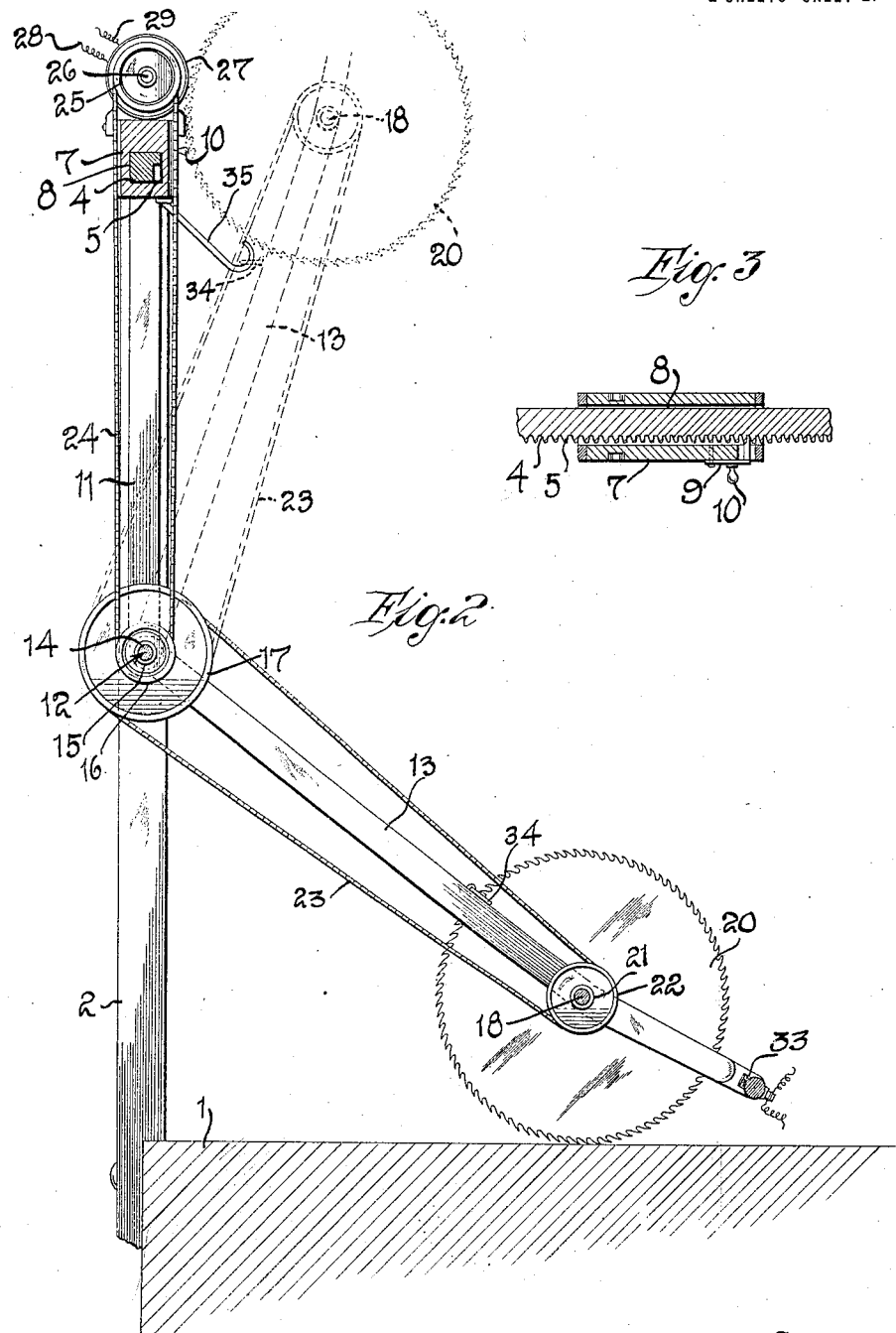
Inventor
F. M. Easton
By Herman A. Phillips
Attorney

UNITED STATES PATENT OFFICE.

FRED M. EASTON, OF SAN BERNARDINO, CALIFORNIA.

SAWING-MACHINE.

1,312,964.     Specification of Letters Patent.     Patented Aug. 12, 1919.

Application filed March 28, 1919. Serial No. 285,786.

*To all whom it may concern:*

Be it known that I, FRED M. EASTON, a citizen of the United States, residing at San Bernardino, in the county of San Bernardino and State of California, have invented certain new and useful Improvements in Sawing-Machines, of which the following is a specification.

My invention relates to improvements in sawing machines, which while capable of many uses is particularly designed for sawing bones.

One object of my invention is the provision of a machine which will be under the control of a single attendant or operator and which can be manipulated with ease to quickly saw the bones of any size or character into sections of any required size.

Another object of my invention is the provision of a machine of the character and for the purpose stated which will be electrically operated and which will be at all times under the control of a single operator, and which will not tire or fatigue such operator.

Another object of my invention is the provision of a machine which will be of small and compact size to occupy a small space; which will accomplish a vast amount of service; which will be of simple, durable and inexpensive construction, and which generally in all important respects will be reliable, efficient and practical.

To attain the objects stated and such others as inhere to an invention of this character, my invention consists of a sawing machine embodying novel features of construction and combination of parts, substantially as disclosed herein.

In order that the construction in detail and the operation of my machine may be fully understood and its many advantages and features of merit be appreciated, I invite attention to the accompanying drawings, in which:

Figure 1 represents a front elevation of a sawing machine constructed in accordance with and embodying my invention.

Fig. 2 represents a sectional view taken on the line 2—2 of Fig. 1, and

Fig. 3 represents a detail view showing the connection between the rack and motor carrying carriage, such mechanism being designed to adjust the carriage in its movements back and forth.

Referring by numerals to the drawings in which the same numerals of reference are used to denote like parts in the three views:

The numeral 1, designates a base or support, which is of the necessary size and shape and may advantageously be made of wood, and from this base rises the pair of uprights 2, in which is mounted the round or journal portions 3, of the square or angle shaped shaft 4, formed on one face with the teeth forming the rack 5, the shaft being maintained in the uprights by means of fastenings 6.

The carriage 7, is formed with a square passage 8, to fit upon the shaft, and is retained at any desired place upon the shaft by means of the spring detent 9, engaging the teeth of the rack, and such spring detent is carried by the carriage and provided with a handle or grasping portion 10, by means of which the detent is manually operated to move the carriage and retain it at any desired place upon the shaft, such detailed construction being clearly shown in Fig. 3.

From this construction it will be noted that the machine consists of a base, a frame rising therefrom, a shaft mounted to swing in said frame, and a carriage mounted upon said shaft and having means for securing it at any desired place upon the shaft, and from the carriage depends a pair of arms 11, to whose lower ends is pivoted at 12, the yoke shaped member 13, the connection 12, being preferably a rod 14, and a surrounding sleeve 15, upon which is mounted the small sprocket wheel 16, and the larger sprocket wheel 17, while near the lower end of said yoke member is mounted a rod 18, carrying upon an extended portion 19 thereof, a saw 20.

Mounted upon the sleeve 21 carried by said rod is a sprocket wheel 22, which is in line with the sprocket wheel 17, the said sprocket wheels 22 and 17 being connected for operation by a chain 23, while a sprocket chain 24, connects for operation the sprocket wheel 16 and the sprocket wheel 25, on the motor shaft 26, of the dynamo or electric motor 27, mounted upon and moving with the carriage 7.

From this construction it will be noted that the carriage has a swinging movement and that pendant from the carriage is a pair of arms and a yoke shaped member is hingedly or swingingly connected to said pair of arms and that power from the motor through the pair of sprocket chains and sprocket wheels imparts to the saw a rapid rotation, and to the motor lead the current supply wires 28 and 29, forming with the branches 30 and 31, a circuit in connection with contact 30' and contact 32, the yoke being provided with a spring hand press contact 33, for opening and closing the circuit between the motor supply wires and the two branch wires for starting and stopping the rotation of the saw.

In the operation of the machine the yoke shaped member is first lowered to bring the saw near the base, this being accomplished by detaching the keeper 34, on said yoke member from the suspension hook 35, depending from the carriage, which having been accomplished, pressure upon the spring hand contact establishes the circuit and the saw through its connections with the motor is rapidly rotated and the sawing of the bone or other object placed upon the base is quickly effected.

It will be understood that the machine while highly desirable for sawing bone, may be used for any other purpose where it would operate in a practical and efficient manner, and it will be apparent that the saw may be instantly thrown into operation and as quickly thrown out of operation; that it can be adjusted to cut particles or sections of any required size; that the machine is easy to operate and control and requires the service of only one person; that the machine is simple, durable and cheap and in all particulars will commend itself as a useful, desirable and practical machine for the intended uses.

I claim:

1. A machine of the character described, consisting of a base, a frame supported thereby, a rock shaft journaled in said frame, a carriage adjustable on said shaft, a motor mounted upon said carriage, a two part hinged member attached to said carriage, a saw carried by one part of said hinged member, and connections between the saw and motor for operating said saw.

2. A machine of the character described, consisting of a base, a pair of standards thereon, an angle shaped shaft having round ends journaled in said standards, a rack on one face of said shaft, a carriage having an angular passage fitting on said shaft, a manually controlled detent in the carriage to engage said rack to retain the carriage adjustably in said shaft, a motor on said carriage having its shaft extended, a sprocket wheel on said end, a two part hinged member depending from said carriage, a pair of shafts carried by said member, sprocket wheels on said shafts, chains connecting the sprocket wheel on the motor shaft and the sprocket wheels of said member, a saw operated by said wheels and chains, and means for starting and stopping the motor to control the operation of said saw.

3. A sawing machine, including a frame, a rock shaft journaled horizontally therein, a carriage movable longitudinally of the rock shaft and having means to hold the same in adjustable relation thereon, a jointed saw frame carried by said carriage, a saw mounted in said saw frame, a motor on the carriage, and operating connections between said motor and the saw, as described.

4. A sawing machine, including a frame, a horizontal rock shaft journaled therein, a carriage adjustably fixed on the said shaft, a jointed sectional saw frame having one section rigid with the carriage and the other section shiftable vertically with respect thereto, a saw mounted in the latter section, a motor mounted on the carriage, and connections between said motor and said saw for driving the latter, as described.

In testimony whereof I affix my signature.

FRED M. EASTON.

Copies of this patent may be obtained for five cents each, by addressing the "Commissioner of Patents, Washington, D. C."